(12) United States Patent
Slavens et al.

(10) Patent No.: US 10,436,113 B2
(45) Date of Patent: Oct. 8, 2019

(54) PLATE FOR METERING FLOW

(71) Applicant: UNITED TECHNOLOGIES CORPORATION, Hartford, CT (US)

(72) Inventors: Thomas N. Slavens, Vernon, CT (US); Dominic J. Mongillo, West Hartford, CT (US); Steven Bruce Gautschi, Naugatuck, CT (US); Jaime G. Ghigliotty, Cabo Rojo, PR (US)

(73) Assignee: United Technologies Corporation, Farmington, CT (US)

( * ) Notice: Subject to any disclaimer, the term of this patent is extended or adjusted under 35 U.S.C. 154(b) by 1035 days.

(21) Appl. No.: 14/816,125

(22) Filed: Aug. 3, 2015

(65) Prior Publication Data

US 2016/0084164 A1    Mar. 24, 2016

Related U.S. Application Data

(60) Provisional application No. 62/052,507, filed on Sep. 19, 2014.

(51) Int. Cl.
*F01D 9/06* (2006.01)
*F02C 7/18* (2006.01)
(Continued)

(52) U.S. Cl.
CPC ............ *F02C 7/18* (2013.01); *F01D 5/081* (2013.01); *F01D 5/145* (2013.01); *F01D 5/18* (2013.01); *F01D 5/181* (2013.01); *F01D 5/182* (2013.01); *F01D 5/183* (2013.01); *F01D 5/184* (2013.01); *F01D 5/185* (2013.01); *F01D 5/186* (2013.01);
(Continued)

(58) Field of Classification Search
CPC ... F01D 5/30; F01D 5/145; F01D 5/18; F01D 9/06; F01D 9/065; F01D 5/181; F01D 5/182; F01D 5/183; F01D 5/184; F01D 5/185; F01D 5/186; F01D 5/187; F01D 5/188; F01D 5/189; F01D 5/081
See application file for complete search history.

(56) References Cited

U.S. PATENT DOCUMENTS 4,664,597 A    5/1987   Auxier et al.
4,669,957 A    6/1987   Phillips et al.
(Continued)

FOREIGN PATENT DOCUMENTS

EP    1489265 A2    12/2004
EP    2559857 A1    2/2013

OTHER PUBLICATIONS

European Search Report for European Application No. 15185189.6 dated Feb. 5, 2016.

*Primary Examiner* — Gerald L Sung
*Assistant Examiner* — Marc J Amar
(74) *Attorney, Agent, or Firm* — Carlson, Gaskey & Olds, P.C.

(57) ABSTRACT

A cooling device for a gas turbine engine component comprises a gas turbine engine component having an upstream channel and a downstream channel that define a cooling flow path. A meter feature includes at least one hole to meter flow from the upstream channel to the downstream channel, and has an upstream side and a downstream side. An exit diffuser extends outwardly from the downstream side of the meter feature to control flow in a desired direction into the downstream channel. A gas turbine engine is also disclosed.

24 Claims, 4 Drawing Sheets

(51) Int. Cl.
*F01D 5/08* (2006.01)
*F01D 5/18* (2006.01)
*F01D 5/14* (2006.01)
*F01D 5/30* (2006.01)
*F02C 3/04* (2006.01)
*F02C 9/16* (2006.01)

(52) U.S. Cl.
CPC ............ *F01D 5/187* (2013.01); *F01D 5/188* (2013.01); *F01D 5/189* (2013.01); *F01D 5/30* (2013.01); *F01D 9/06* (2013.01); *F01D 9/065* (2013.01); *F02C 3/04* (2013.01); *F02C 9/16* (2013.01); *F05D 2220/32* (2013.01); *F05D 2250/51* (2013.01); *F05D 2250/71* (2013.01); *F05D 2250/72* (2013.01); *F05D 2250/73* (2013.01); *F05D 2260/232* (2013.01); *Y02T 50/676* (2013.01)

(56) References Cited

U.S. PATENT DOCUMENTS

| | | | |
|---|---|---|---|
| 4,684,323 A | 8/1987 | Field | |
| 4,738,588 A | 4/1988 | Field | |
| 5,403,156 A | 4/1995 | Arness et al. | |
| 5,645,397 A * | 7/1997 | Soechting | F01D 5/187 415/115 |
| 6,422,810 B1 * | 7/2002 | Burdgick | F01D 5/18 415/115 |
| 6,491,496 B2 | 12/2002 | Starkweather | |
| 7,857,580 B1 | 12/2010 | Liang | |
| 8,016,547 B2 | 9/2011 | Propheter-Hinckley | |
| 8,043,058 B1 * | 10/2011 | Liang | F01D 5/187 415/173.1 |
| 8,827,632 B1 | 9/2014 | Lee et al. | |
| 2004/0258516 A1 * | 12/2004 | Beverley | F01D 5/187 415/115 |
| 2006/0093470 A1 * | 5/2006 | Bermond | F01D 5/147 415/115 |
| 2007/0140848 A1 * | 6/2007 | Charbonneau | F01D 5/081 416/96 R |
| 2009/0293495 A1 | 12/2009 | Correia | |
| 2010/0005804 A1 * | 1/2010 | Chen | F01D 9/023 60/752 |
| 2010/0329835 A1 | 12/2010 | Spangler et al. | |
| 2013/0081399 A1 * | 4/2013 | Wiebe | F01D 9/023 60/752 |
| 2013/0280093 A1 * | 10/2013 | Zelesky | B22C 9/10 416/97 R |
| 2014/0030088 A1 * | 1/2014 | Coffin | F01D 25/16 415/229 |
| 2014/0093379 A1 * | 4/2014 | Tibbott | F01D 5/189 416/224 |
| 2016/0153404 A1 * | 6/2016 | Guidi | F02M 26/19 123/568.17 |

* cited by examiner

PLATE FOR METERING FLOW

CROSS-REFERENCE TO RELATED APPLICATION

This application claims priority to U.S. Provisional Patent Application No. 62/052,507, filed Sep. 19, 2014.

BACKGROUND OF THE INVENTION

In pursuit of higher engine efficiencies, higher turbine inlet temperatures have been relied upon to boost overall engine performance. This can result in gas path temperatures that may exceed melting points of turbine component constituent materials. To address this issue, dedicated cooling air is extracted from a compressor section and is used to cool the gas path components in the turbine, such as rotating blades and stator vanes for example, incurring significant cycle penalties.

One method of controlling cooling flow involves the use of metering plates. Metering plates are positioned in a flow path between an upstream channel and a downstream channel. A meter plate is typically a single piece of thin sheet-metal with at least one hole that has a size that is significantly smaller than the downstream channel. These types of plates are effective in metering flow; however, the plates deflect flow in a way that can degrade downstream flow attachment.

For example, a jet stream exiting a hole in the meter plate can induce a region of poor attachment, i.e. a dead zone, when the downstream channel has a direction of flow that is not aligned with the direction of flow of the jet stream. This dead zone can lead to higher overall pressure losses and degradation in heat transfer on the non-flow attached wall. This adversely affects cooling efficiencies.

SUMMARY OF THE INVENTION

In a featured embodiment, a cooling device for a gas turbine engine component comprises a gas turbine engine component having an upstream channel and a downstream channel that define a cooling flow path. A meter feature includes at least one hole to meter flow from the upstream channel to the downstream channel, and has an upstream side and a downstream side. An exit diffuser extends outwardly from the downstream side of the meter feature to control flow in a desired direction into the downstream channel.

In another embodiment according to the previous embodiment, the exit diffuser comprises a ring-shaped structure that surrounds the hole.

In another embodiment according to any of the previous embodiments, the ring-shaped structure has an outer peripheral edge that is spaced outwardly from the downstream side of the meter feature by a distance. The distance remains generally constant about the hole.

In another embodiment according to any of the previous embodiments, the ring-shaped structure has an outer peripheral edge that is spaced outwardly from the downstream side of the meter feature by a distance. The distance varies about the hole.

In another embodiment according to any of the previous embodiments, the ring-shaped structure has a downstream diameter and an upstream diameter that is greater than the downstream diameter.

In another embodiment according to any of the previous embodiments, the ring-shaped structure has a curved surface that extends from the downstream diameter to the upstream diameter.

In another embodiment according to any of the previous embodiments, the ring-shaped structure has an inner surface defining the flow path, and includes at least one turbulator on the inner surface.

In another embodiment according to any of the previous embodiments, the exit diffuser is non-symmetrical about the hole.

In another embodiment according to any of the previous embodiments, the exit diffuser is symmetrical about the hole.

In another embodiment according to any of the previous embodiments, an inlet bellmouth extends outwardly from the upstream side of the meter feature.

In another embodiment according to any of the previous embodiments, the inlet bellmouth is non-symmetrical about the hole.

In another embodiment according to any of the previous embodiments, the hole in the meter feature defines a first flow axis. The downstream channel defines a second flow axis that is obliquely orientated to the first flow axis.

In another embodiment according to any of the previous embodiments, the gas turbine engine component comprises an airfoil. The meter feature comprises a meter plate.

In another embodiment according to any of the previous embodiments, the airfoil includes a platform with the downstream channel comprising a cooling channel in the airfoil. The meter plate is mounted within the platform.

In another embodiment according to any of the previous embodiments, a gas turbine engine comprises a compressor section, a combustor section downstream of the compressor section, and a turbine section downstream of the combustor section. At least one of the combustor section and the turbine section include a component having an upstream channel and a downstream channel that define a cooling flow path. A meter feature includes at least one hole to meter flow from the upstream channel to the downstream channel, the meter feature having an upstream side and a downstream side. An exit diffuser extends outwardly from the downstream side of the meter feature to control flow in a desired direction into the downstream channel.

In another embodiment according to the previous embodiment, the exit diffuser is non-symmetrical about the hole.

In another embodiment according to any of the previous embodiments, the exit diffuser is symmetrical about the hole.

In another embodiment according to any of the previous embodiments, an inlet bellmouth extends outwardly from the upstream side of the meter feature.

In another embodiment according to any of the previous embodiments, the exit diffuser comprises a ring-shaped structure that surrounds the hole. The ring-shaped structure has a downstream diameter and an upstream diameter that is greater than the downstream diameter. The ring-shaped structure has a curved surface that extends from the downstream diameter to the upstream diameter.

In another embodiment according to any of the previous embodiments, the hole in the meter feature defines a first flow axis. The downstream channel defines a second flow axis that is obliquely orientated to the first flow axis.

These and other features may be best understood from the following drawings and specification.

DETAILED DESCRIPTION

Figure 1:
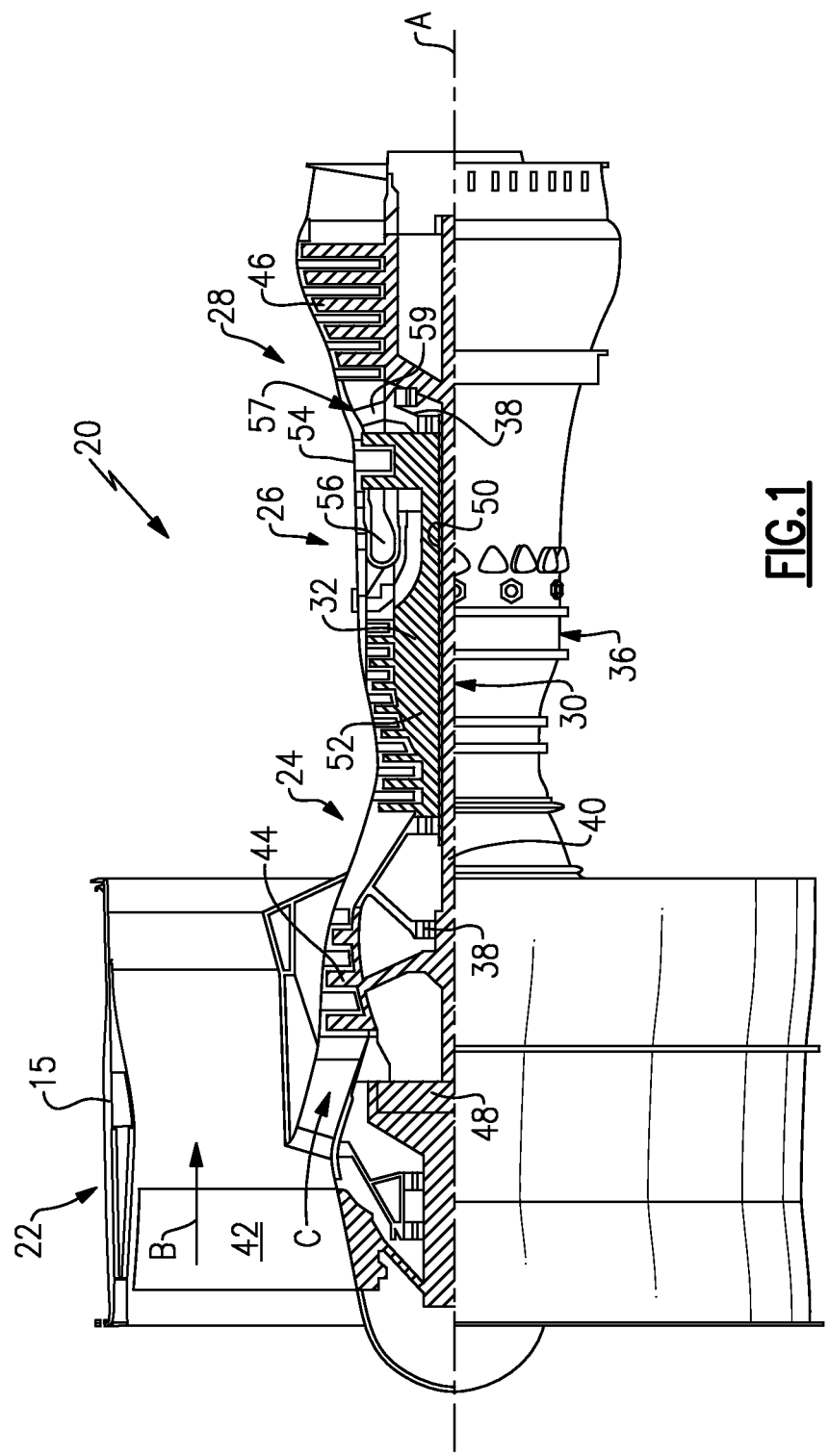
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
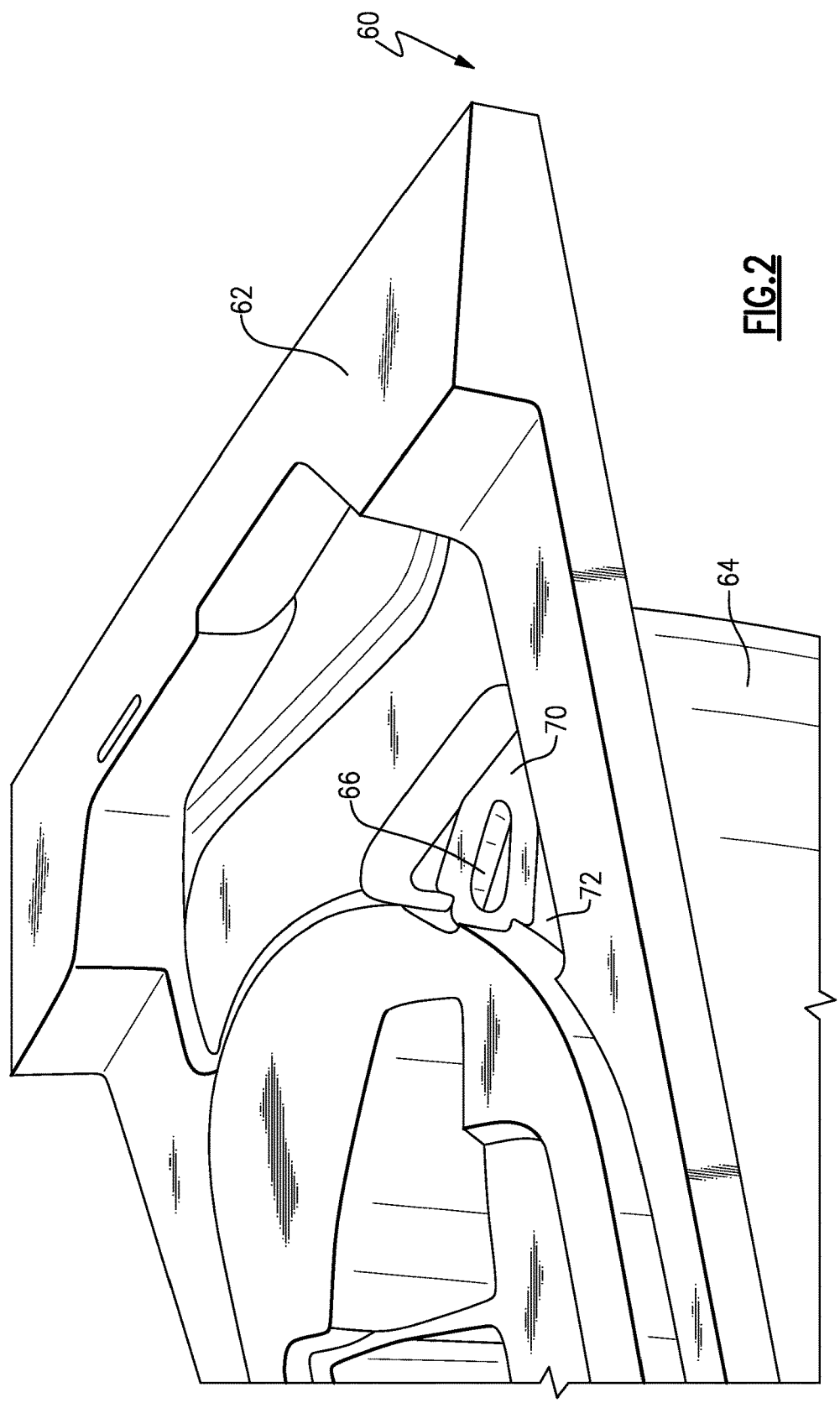
FIG. 2 is a magnified bottom perspective view, partially cut-away, of a platform of an airfoil component with a meter plate.

Airfoils located downstream of combustor section 26, such as stator vanes and rotor blades in the turbine section 28, for example, operate in a high-temperature environment. Airfoils that are exposed to high temperatures typically include internal cooling channels that direct a flow of cooling air through the airfoil to remove heat and prolong the useful life of the airfoil. FIG. 2 shows a vane 60 having a platform 62 with an airfoil section 64 extending outwardly of the platform 62. The platform 62 includes an opening to at least one internal cooling channel 66 that is located within the airfoil section 64. The cooling channel 66 forms a cooling flowpath to internally cool the airfoil section 64.

A meter feature, such as a meter plate 70 for example, is associated with the cooling channel 66 to meter flow from an upstream location to a downstream location. In one example, the metering plate 70 is mounted within a recessed area 72 formed within the platform 62. FIGS. 3-7 show various examples of the metering plate 70.

Figure 3:
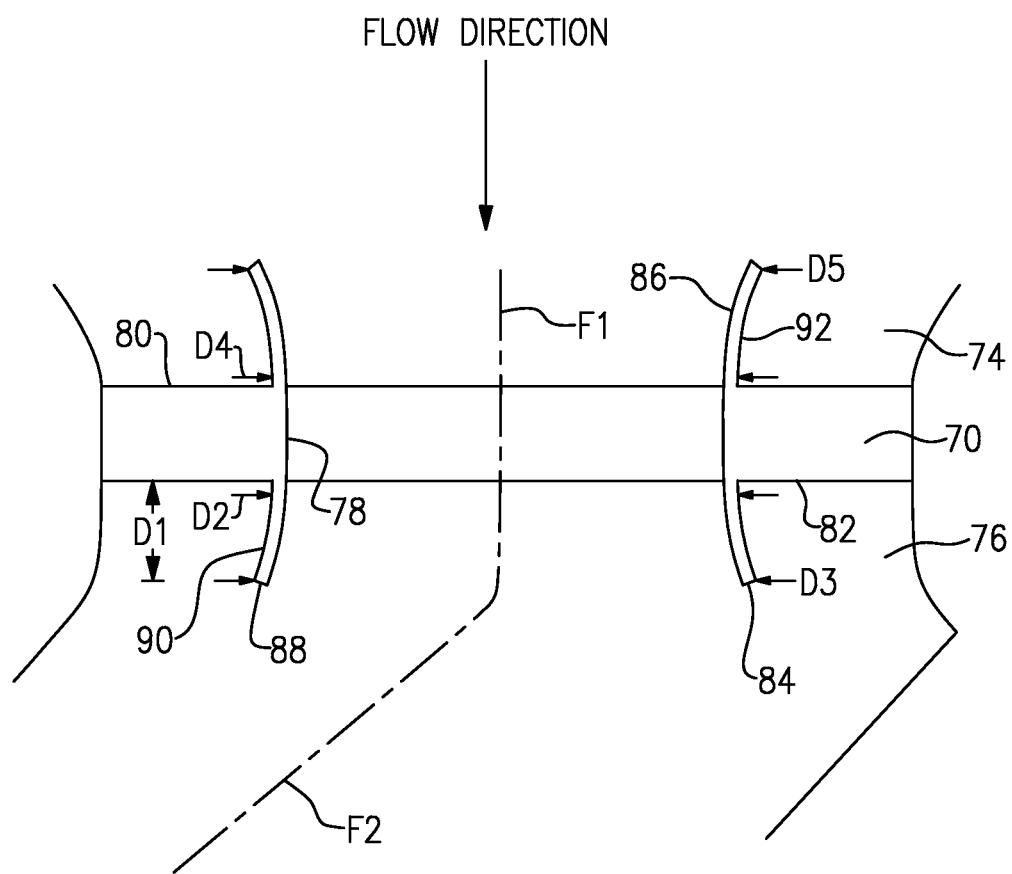
FIG. 3 is a side section view of on example of a metering plate with an exit diffuser and an inlet bellmouth.
Figure 4:
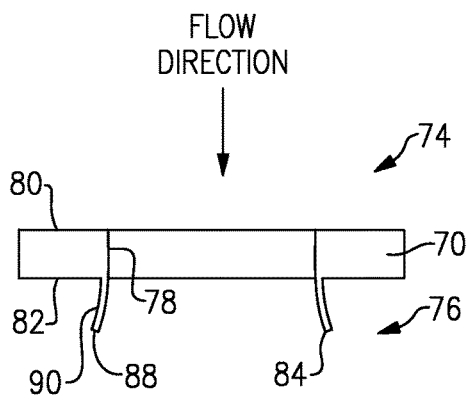
FIG. 4 is a side section of a metering plate with another example of an exit diffuser, and which shows a configuration without an inlet bellmouth.

FIG. 3 shows the meter plate 70 positioned between an upstream channel 74 and a downstream channel 76 that together define the cooling flow path. In this example, the meter plate 70 includes at least one hole 78 to meter flow from the upstream channel 74 to the downstream channel 76. The size of the hole 78 is smaller than a cross-sectional size of the downstream channel 76.

The meter plate 70 has an upstream side 80 and a downstream side 82. The hole 78 extends through a thickness of the meter plate 70 from the upstream side 80 to the downstream side 82. An exit diffuser 84 extends outwardly from the downstream side 82 of the meter plate 70 to control flow in a desired direction into the downstream channel 76. The exit diffuser 84 facilitates spreading out the flow over a greater area, lowers pressure loss into the downstream channel 76, and increases heat transfer to a shadowed wall of an angled downstream cavity. This will be discussed in greater detail below.

The meter plate 70 defines a first flow axis F1 that may or may not be aligned with a flow axis of the upstream channel 74. In one example, the downstream channel 76 defines a flow axis F2 that is not aligned with the first flow axis F1. For example, the second flow axis F2 may be obliquely orientated relative to the first flow axis F1. This creates a shadowed wall portion, i.e. a potential "dead zone" portion. The use of the exit diffuser 84 facilitates flow attachment to the off-angled, i.e. non-aligned, downstream channel 76 and significantly reduces pressure and cooling losses previously attributed to the dead zone area.

The example in FIG. 3 also shows an inlet bellmouth 86 that extends outwardly from the upstream side 80 of the meter plate 70. The inlet bellmouth 86 facilitates directing flow into the hole 78 in the meter plate 70. Optionally, the inlet bellmouth 86 can be removed if not needed (see FIG. 4).

In the example of FIG. 3, the exit diffuser 84 comprises a continuous ring-shaped structure that surrounds the hole 78. In this example, the ring-shaped structure is symmetrical about the hole 78. The ring-shaped structure has an outer peripheral edge 88 that is spaced outwardly from the downstream side 82 of the meter plate 70 by a distance D1. In this symmetrical configuration, the distance D1 remains generally constant about the hole 78.

In one example, the exit diffuser 84 has an upstream diameter D2 and a downstream diameter D3 that is greater than the upstream diameter D2. A curved surface 90 extends from the upstream diameter D2 to the downstream diameter D3 to form the ring-shaped exit diffuser 84.

In the example shown in FIG. 3, the exit diffuser 84 includes the curved surface 90 in the symmetrical configuration. In this example, the inlet bellmouth 86 is similarly configured to the exit diffuser 84. The inlet bellmouth 86 is symmetrical about the hole 78 and includes a curved surface 92 that extends from a downstream diameter D4 to an upstream diameter D5 that is greater than the downstream diameter D4. The combination of the upstream curved surface 92 and the downstream curved surface 90 cooperate to direct cooling flow through the meter hole 78 and into the downstream channel 76 without a significant pressure loss and while spreading the flow throughout the channel 76 more evenly.

As discussed above, FIG. 4 shows an example that includes the exit diffuser 84 of FIG. 3 but which does not include the inlet bellmouth 86.

Figure 5:
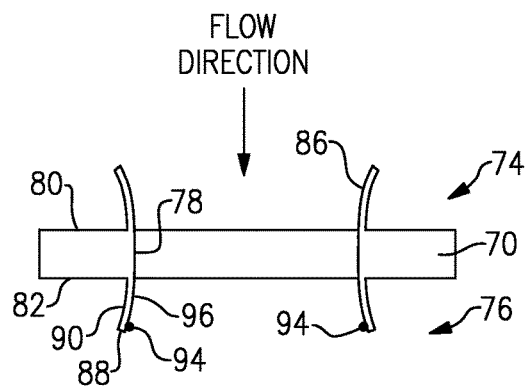
FIG. 5 is a side section of a metering plate with another example of an exit diffuser with a turbulator and an inlet bellmouth.

FIG. 5 shows a view similar to FIG. 3 but shows an example that includes at least one exit turbulator 94. In this example, exit diffuser includes an inner surface 96 that defines the flow path. The at least one turbulator 94 is formed with or mounted on the inner surface 96. The turbulator 94 comprises one or more raised surface portions or protuberances that further facilitate spread in flow more evenly in the downstream channel 76.

Figure 6:
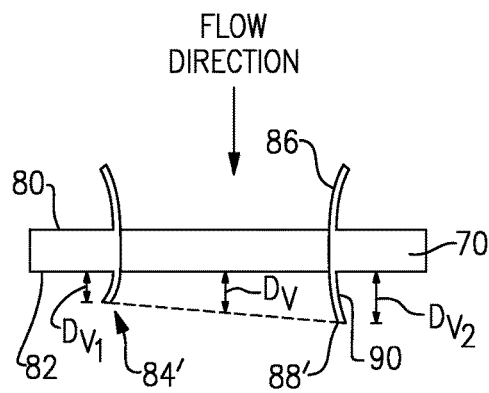
FIG. 6 is a side section of a metering plate with another example of an exit diffuser and an inlet bellmouth.

FIG. 6 shows another example of the exit diffuser 84'. In this example, the exit diffuser 84' is non-symmetrical about the hole 78. The ring-shaped structure has an outer peripheral edge 88' that is spaced outwardly from the downstream side 82 of the meter plate 70 by a distance Dv that varies about the hole. For example, on one side of the exit diffuser 84' the outer peripheral edge 88' is spaced from the downstream surface 82 by a first distance Dv1 and on another side of the exit diffuser 84' the outer peripheral edge 88' is spaced from the downstream surface 82 by a second distance Dv2 that is greater than the first distance Dv1. The non-symmetrical configuration offers the advantage of less "jetting" through the hole and a more uniform diffusion.

In the configuration of FIG. 6, the inlet bellmouth 86 is symmetrical about the hole 78 similar to that of FIG. 3.

Figure 7:
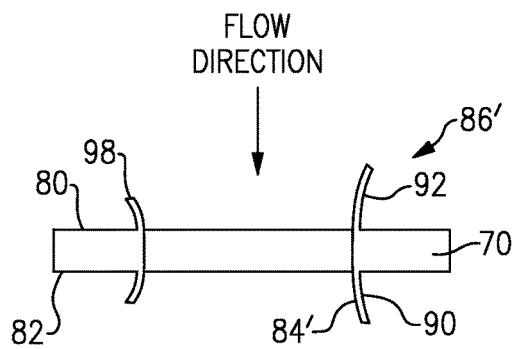
FIG. 7 is a side section of a metering plate with another example of an exit diffuser and another example of an inlet bellmouth.

In FIG. 7, there is an example of an inlet bellmouth 86' that is non-symmetrical about the hole 78. An outer peripheral edge 98 of the inlet bellmouth 86' is at a distance that varies from the upstream surface 80 of the meter plate 70 about the hole 78.

It should be understood that the various embodiments of the exit diffuser 84, 84' can be used in any combination with the inlet bellmouths 86, 86'. Further, any of the exit diffusers 84, 84' can be used without the inlet bellmouths 86, 86'.

However, in each of the embodiments, the meter plate 70 is a single-piece structure that is formed by an additive machining process. Any additive machining process can be used. The maximum distance of the outer peripheral edges 88, 88', 98 from the respective upstream 80 or downstream 82 surface of the meter plate 70 is approximately one-tenth of an inch (2.54 mm) or less. The additive machining process makes it very cost effective to form the exit diffusers and inlet bellmouths as described above.

The subject invention utilizes a thin wall meter plate with an exit diffuser to maintain downstream pressure and cooling effectiveness at desired levels. This overcomes prior issues with traditional configurations where there was a large depletion in downstream pressure and reduced cooling effectiveness. The exit diffuser settles and spreads the flow more evenly through the downstream cavity. This spreading greatly reduces the losses through the metering device and better distributes the flow as compared to prior metering devices without an exit diffuser. A comparison between a traditional configuration and a configuration with an exit diffuser as described above has shown that the downstream pressure of the downstream cavity is greatly increased by using the exit diffuser. This is primarily because the exit diffuser allows the flow to evenly distribute in the chamber before exiting the chamber.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A cooling device for a gas turbine engine component comprising:

a gas turbine engine component having an upstream channel and a downstream channel that define a cooling flow path, and wherein the gas turbine engine component includes a platform with an opening to the downstream channel;

a meter feature including a meter plate associated with the opening and having at least one hole to meter flow from the upstream channel to the downstream channel, the meter plate having an upstream side and a downstream side, and wherein the at least one hole defines a center axis; and an exit diffuser extending outwardly from the downstream side of the meter feature to control flow in a desired direction into the downstream channel, wherein the exit diffuser comprises a ring-shaped structure with an open center defined by an inner peripheral surface surrounding the center axis, and wherein the ring-shaped structure extends from the meter plate to a distal edge that opens into the downstream channel, and wherein the inner peripheral surface comprises a curved surface that curves from the meter plate to the distal edge, and wherein the curved surface curves radially outward from the meter plate until the distal edge.

2. The cooling device according to claim 1, wherein the distal edge is spaced outwardly from the downstream side of the meter plate by a distance, and wherein the distance remains generally constant about the hole.

3. The cooling device according to claim 1, wherein the distal edge is spaced outwardly from the downstream side of the meter plate by a distance, and wherein the distance varies about the hole.

4. The cooling device according to claim 1, wherein the ring-shaped structure has a downstream diameter at the distal edge and an upstream diameter at the meter plate that is less than the downstream diameter.

5. The cooling device according to claim 1, including at least one turbulator on the inner peripheral surface.

6. The cooling device according to claim 1, wherein the exit diffuser is non-symmetrical about the hole.

7. The cooling device according to claim 1, wherein the exit diffuser is symmetrical about the hole.

8. The cooling device according to claim 1, including an inlet bellmouth extending outwardly from the upstream side of the meter plate.

9. The cooling device according to claim 8, wherein the inlet bellmouth is non-symmetrical about the hole.

10. The cooling device according to claim 1, wherein the center axis defines a first flow axis, and wherein the downstream channel defines a second flow axis that is obliquely orientated to the first flow axis.

11. The cooling device according to claim 1, wherein the gas turbine engine component comprises an airfoil.

12. The cooling device according to claim 11, wherein the airfoil includes the platform with the downstream channel comprising a cooling channel in the airfoil, and wherein the meter plate is mounted within the platform.

13. A gas turbine engine comprising:
a compressor section;
a combustor section downstream of the compressor section; and
a turbine section downstream of the combustor section, and wherein at least one of the combustor section and the turbine section include a component having an upstream channel and a downstream channel that define a cooling flow path, and wherein the component includes a platform with an opening to the downstream channel;

a meter feature including a meter plate associated with the opening and having at least one hole to meter flow from the upstream channel to the downstream channel, the meter plate having an upstream side and a downstream side, and wherein the at least one hole defines a center axis; and an exit diffuser extending outwardly from the downstream side of the meter feature to control flow in a desired direction into the downstream channel, wherein the exit diffuser comprises a ring-shaped structure with an open center defined by an inner peripheral surface surrounding the center axis, and wherein the ring-shaped structure extends from the meter plate to a distal edge that opens into the downstream channel, and wherein the inner peripheral surface comprises a curved surface that curves from the meter plate to the distal edge, and wherein the curved surface curves radially outward from the meter plate until the distal edge.

14. The gas turbine engine according to claim 13, wherein the exit diffuser is non-symmetrical about the hole.

15. The gas turbine engine according to claim 13, wherein the exit diffuser is symmetrical about the hole.

16. The gas turbine engine according to claim 13, including an inlet bellmouth extending outwardly from the upstream side of the meter plate.

17. The gas turbine engine according to claim 13, wherein the ring-shaped structure has a downstream diameter at the distal edge and an upstream diameter at the meter plate that is less than the downstream diameter.

18. The gas turbine engine according to claim 13, wherein the center axis defines a first flow axis, and wherein the downstream channel defines a second flow axis that is obliquely orientated to the first flow axis.

19. The gas turbine engine according to claim 13, wherein the meter plate and exit diffuser comprise a single-piece structure.

20. The cooling device according to claim 1, wherein the meter plate and exit diffuser comprise a single-piece structure.

21. A cooling device for a gas turbine engine component comprising:
a gas turbine engine component having an upstream channel and a downstream channel that define a cooling flow path, and wherein the gas turbine engine component includes a platform with an opening to the downstream channel; and a meter feature comprising a single-piece structure that comprises a meter plate and an exit diffuser, the meter plate associated with the opening and having at least one hole to meter flow from the upstream channel to the downstream channel, the meter plate having an upstream side and a downstream side, and the exit diffuser extending outwardly from the downstream side of the meter feature to control flow in a desired direction into the downstream channel, wherein the exit diffuser comprises a ring-shaped structure with an open center defined by an inner peripheral surface surrounding a center axis, and wherein the ring-shaped structure extends from the meter plate to a distal edge that opens into the downstream channel, and wherein the inner peripheral surface comprises a curved surface that curves from the meter plate to the distal edge, and wherein the curved surface curves radially outward from the meter plate until the distal edge.

22. The cooling device according to claim 21, wherein the single-piece structure includes an inlet bellmouth extending outwardly from the upstream side of the meter plate.

23. The cooling device according to claim 21, wherein the at least one hole defines the center axis.

24. The cooling device according to claim 23, wherein the ring-shaped structure has a downstream diameter at the distal edge and an upstream diameter at the meter plate that is less than the downstream diameter.

* * * * *